United States Patent [19]

Werner

[11] 4,148,471

[45] Apr. 10, 1979

[54] APPARATUS FOR FABRICATING WOOD STRUCTURES

[75] Inventor: James O. Werner, Ballwin, Mo.

[73] Assignee: Hydro-Air Engineering, Inc., St. Louis, Mo.

[21] Appl. No.: 761,612

[22] Filed: Jan. 21, 1977

[51] Int. Cl.$^2$ .......... B23Q 3/00

[52] U.S. Cl. .......... 269/321 F

[58] Field of Search .......... 269/321 F, 134–138; 100/DIG. 13, 100, 264, 269 R; 144/288 C; 227/152

[56] References Cited

U.S. PATENT DOCUMENTS

| | | | |
|---|---|---|---|
| 3,785,635 | 1/1974 | Lassy et al. | 269/138 |
| 4,044,093 | 8/1977 | Jureit et al. | 269/321 F |

*Primary Examiner*—Robert C. Watson

*Attorney, Agent, or Firm*—Koenig, Senniger, Powers and Leavitt

[57] ABSTRACT

Apparatus for fabricating flat floor trusses or other wood structures, the apparatus including a number of wood member support frames securable together in end-to-end abutting relation with each of the frames having a tongue at one end thereof and a groove at the other end thereof whereby the groove of one of the frames receives the tongue of another of the frames to facilitate rapid set-up of the frames with the frames in proper alignment with one another. Lumber stops are provided on support frames for accurately positioning the chord members of the truss and for preventing outward movement thereof, but yet permitting a completed truss to be readily lifted from the support frames without unclamping or releasing the stops and without undue friction from the stops. The support frames further include a plurality of wood member support platforms adjustably movable along the length of the support or readily removable therefrom so as to support the wood members at the joints of the truss being formed.

6 Claims, 9 Drawing Figures

APPARATUS FOR FABRICATING WOOD STRUCTURES

BACKGROUND OF THE INVENTION

This invention relates to apparatus for fabricating wood structures, and is more particularly concerned with apparatus for fabricating relatively shallow-depth (e.g., 12 to 36 inches) flat trusses used as floor joists.

In conventional construction practice, solid wood members, such as 2×10 lumber, have been commonly used for floor joists. In recent years, however, flat floor trusses have been substituted for solid wood floor joists due to the increased cost of solid wood floor joist lumber and the scarcity of long-span lumber of the required dimensions. Flat floor trusses are typically made of less expensive 2×4 lumber. The wood members comprising the chords of the truss may be of shorter length than the length of the truss because two or more 2×4 members may be readily spliced together in end-to-end relation. Relatively short lengths of 2×4 lumber (even scrap lumber from other structures) may be used for the web members of the truss. Thus, flat floor trusses of virtually any desired length (or span) and depth may be fabricated from readily available and inexpensive 2×4 lumber. Floor trusses are generally lighter in weight than solid wood joist members of comparable strength and may be designed to have a longer span than the span length of commonly available solid wood floor joists. Flat floor trusses can be designed to have a predetermined amount of upward bow or camber so that the truss will be nearly flat when loaded, thus preventing sagging of the floor in the building. Also, flat floor trusses offer considerable labor savings during construction of the building because the electrical wiring, plumbing, heating and air conditioning ducts may be readily routed through openings in the flat floor trusses. Flat floor trusses also provide unobstructed upper and lower faces to which subflooring or ceiling sheathing may readily be nailed.

Flat floor truss fabricating apparatus requires special types of equipment to accommodate the relatively shallow depth of floor trusses and yet must be sufficiently adjustable to support various configurations of wood members at the joints of the truss to be fabricated. Typical prior art flat floor truss fabricating apparatus are shown in U.S. Pat. Nos. 3,388,657, 3,742,569, 3,978,783, and 3,866,350, and in copending U.S. patent application Ser. No. 622,448, filed Oct. 14, 1975 issued May 24, 1977 as U.S. Pat. No. 4,024,809.

Because flat floor trusses are only now being introduced into the home construction field, many truss manufacturers are now set up to manufacture only peaked roof trusses which heretofore have been the mainstay of their business. Many truss fabricators, especially smaller, low-volume fabricators, are reluctant to begin making flat floor trusses because of the relatively high capital investment required to purchase special flat floor truss fabricating apparatus or because they may not have sufficient floor space in their existing plants to accommodate an additional truss fabricating machine.

SUMMARY OF THE INVENTION

Among the several objects of this invention may be noted the provision of apparatus for fabricating shallow-depth, flat floor trusses which is adjustable to accommodate trusses of various depths, lengths, cambers and configurations; the provision of such apparatus which utilizes a minimum of floor space; the provision of such apparatus which may be used in conjunction with the base and the press of a conventional roof truss fabricating apparatus thereby to adapt this roof truss fabricating apparatus to fabricate flat floor trusses; the provision of such apparatus which may be readily and accurately set up to fabricate flat floor trusses and which may be readily torn down; the provision of such apparatus in which the wood member supports may be installed on or removed from the apparatus at any position therealong; the provision of such apparatus stops which securely hold the wood members tightly clamped relative to one another prior to their being secured together and which permits a completed truss to be vertically ejected or lifted from the apparatus without having to release the means holding the wood members and without undue friction between the completed truss and the wood member holding means as the truss is ejected; and the provision of such apparatus which is of rugged and economical construction.

Briefly, the stops of this invention constitute a part of a supporting means used in apparatus for fabricating wood structures, such as wood trusses, wall panels or the like, from wood members secured together by nailing plates. These stops hold the wood members prior to and while being secured together by nailing plates driven thereinto. Each stop comprises a stop base adapted for adjustment to different positions on the supporting means and an abutment member having a face engageable by a wood member. The abutment member is mounted on the stop base for movement of its face upwardly from a lowered stop position in which the abutment member prevents horizontal outward movement of the wood member by engagement of the wood member with its face and for movement of its face at least in part outwardly from said wood member to release the wood structure for removal thereof from the supporting means. The upward and outward movement of the face of the abutment means for the release of the wood structure is caused by the lifting of the wood structure from the supporting means after the nailing plates are driven thereinto.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
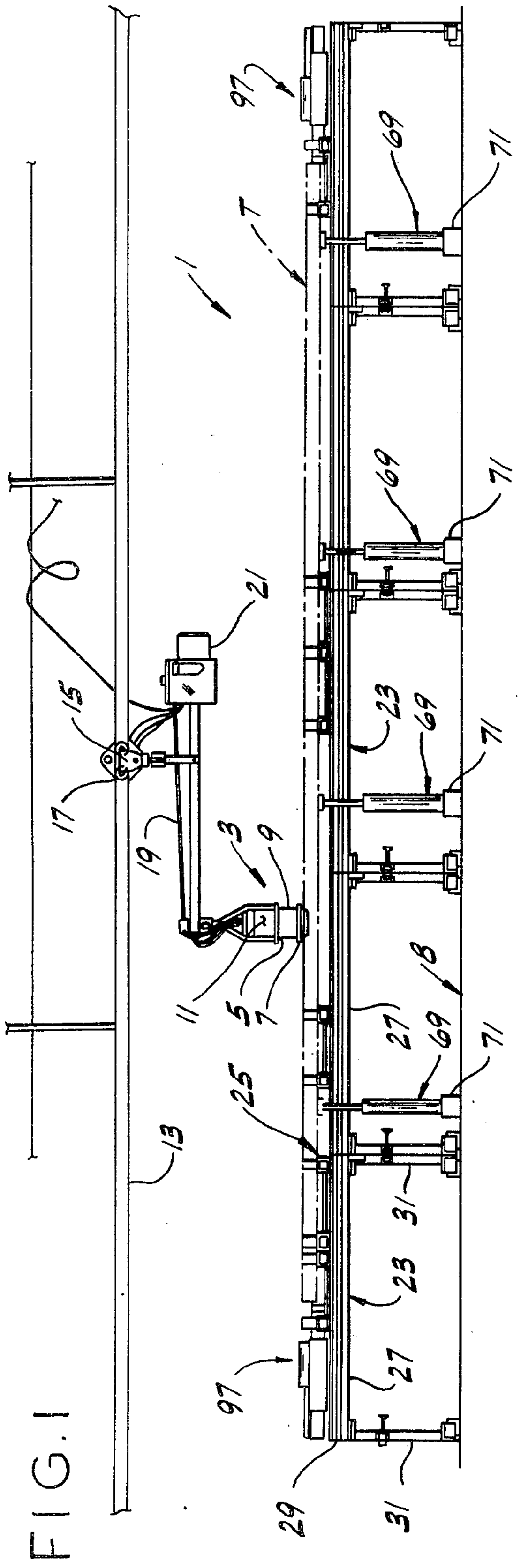
FIG. 1 is a front elevational view of truss fabricating apparatus of this invention illustrating a series of support frames secured together in end-to-end relation on a magnetizable floor and a hydraulic press mounted on an overhead monorail.

Referring now to the drawings, apparatus of this invention, indicated in its entirety at 1, is shown in FIG. 1 for fabricating wood trusses T of the type having lower chord members LC, upper chord members UC and web members W extending from the lower chord members to the upper chord members. More particularly, apparatus of this invention is especially useful for fabricating flat, shallow-depth trusses made of 2×4 commercially available lumber for use as floor joists. The truss shown in FIG. 2 has a duct opening DO formed at the midpoint of the truss to permit ventilating ducts to be routed between the upper and lower chords. Duct openings DO are defined by a pair of spaced-apart vertical inner web members VW, one on each side of the midpoint of the truss, and by the upper and lower chords. It will be understood, however, that apparatus of this invention may also be utilized to fabricate trusses of other configurations without the above-said duct openings, and with suitable modification to fabricate other types of wood structures, such as wall sections having upper and lower plate members with wall studs extending perpendicularly therebetween and secured thereto by nailing plates with the upper and lower plates corresponding generally to the upper and lower chords UC and LC and with the studs corresponding generally to the webs W of truss T. Apparatus 1 comprises a press, as indicated at 3, having an upper platen 5 and a lower platen 7 which are relatively movable toward and away from one another for driving nailing plates N into two or more of the wood members from above and below (see FIG. 6) thereby to rigidly secure the wood members together at the joints of the truss.

Press 3 is shown to be an overhead suspended press, similar to that used in roof truss fabricating machine commercially available from Hydro-Air Engineering, Inc. of St. Louis, Mo., under their registered trademark MONOPRESS and as shown in U.S. Pat. Nos. 3,068,484 and 3,742,569. Heretofore, MONOPRESS roof truss fabricating machines have found widespread commercial acceptance among many roof truss fabricators. The floor truss fabricating apparatus of this invention is primarily intended to be used in conjunction with many of the components of the MONOPRESS roof truss machine including the overhead suspended press and the base on which the lumber support stands are located and secured. As shown herein, this base is a magnetizable base B of flat steel plates joined in edge-to-edge abutting relation to form a continuous surface. It will be understood, however, that the base may be a floor mounted track, such as is shown in the above-mentioned U.S. Pat. No. 3,742,569, on which the lumber support stands are carried.

Generally, press 3 includes a rigid C-shaped frame 9 fixedly carrying upper platen 5 and movably carrying lower platen 7 for movement toward and away from the upper platen by means of a hydraulic cylinder unit 11 carried by frame 5. The press further includes an overhead monorail 13, a carriage 15 movable along the monorail, a hydraulic motor 17 for selectively driving the carriage along the monorail in one direction or the other, and a hanger boom 19 suspended from the carriage. A hydraulic pump and motor unit 21 is also carried by the boom for pumping hydraulic fluid under pressure to motor 17 and to hydraulic cylinder unit 11. Operation of hydraulic motor 17 for driving the carriage along the monorail and operation of press 3 are controlled by pushbuttons on the press. Reference may be made to the above-mentioned U.S. Pat. No. 3,068,484, which is herein incorporated by reference, for a more complete description of the structure of the press and its operation.

In accordance with this invention, a plurality of wood member support frames, each of which is generally indicated at 23, is provided on base B for supporting the wood members of truss T in position for being secured together by nailing plates N. The elongate support frames are shown to be secured together in end-to-end abutting relation so as to form a support at least as long as truss T to be fabricated thereon. Each of the frames is adapted to carry one or more lumber support platforms, as is generally indicated at 25. More specifically, each frame 23 has an elongate main beam 27 on top of which is mounted a center track 29. Legs 31 extend down from beam 27 for supporting the frame on base B. Each of the lumber support platforms 25 is releasably securable to track 29 so that it may be readily moved to a desired position therealong or may be readily removed therefrom as required. Platforms 25 are provided for supporting both upper and lower chord members UC and LC, respectively, and the web members W of truss T with the support platforms for the upper and lower chord members being arranged in back-to-back relation on track 29 (see FIG. 2). As mentioned above, the platforms may be readily positioned along the track and are preferably positioned so that each of the platforms is generally centered on a joint of the truss (i.e., at the intersection of one or more of the wood members) with each of these platforms constituting a station at which press 3 may be moved into an operating position for driving or pressing nailing plates into the wood members from above and below thereby to secure the wood members to one another.

Figure 3:
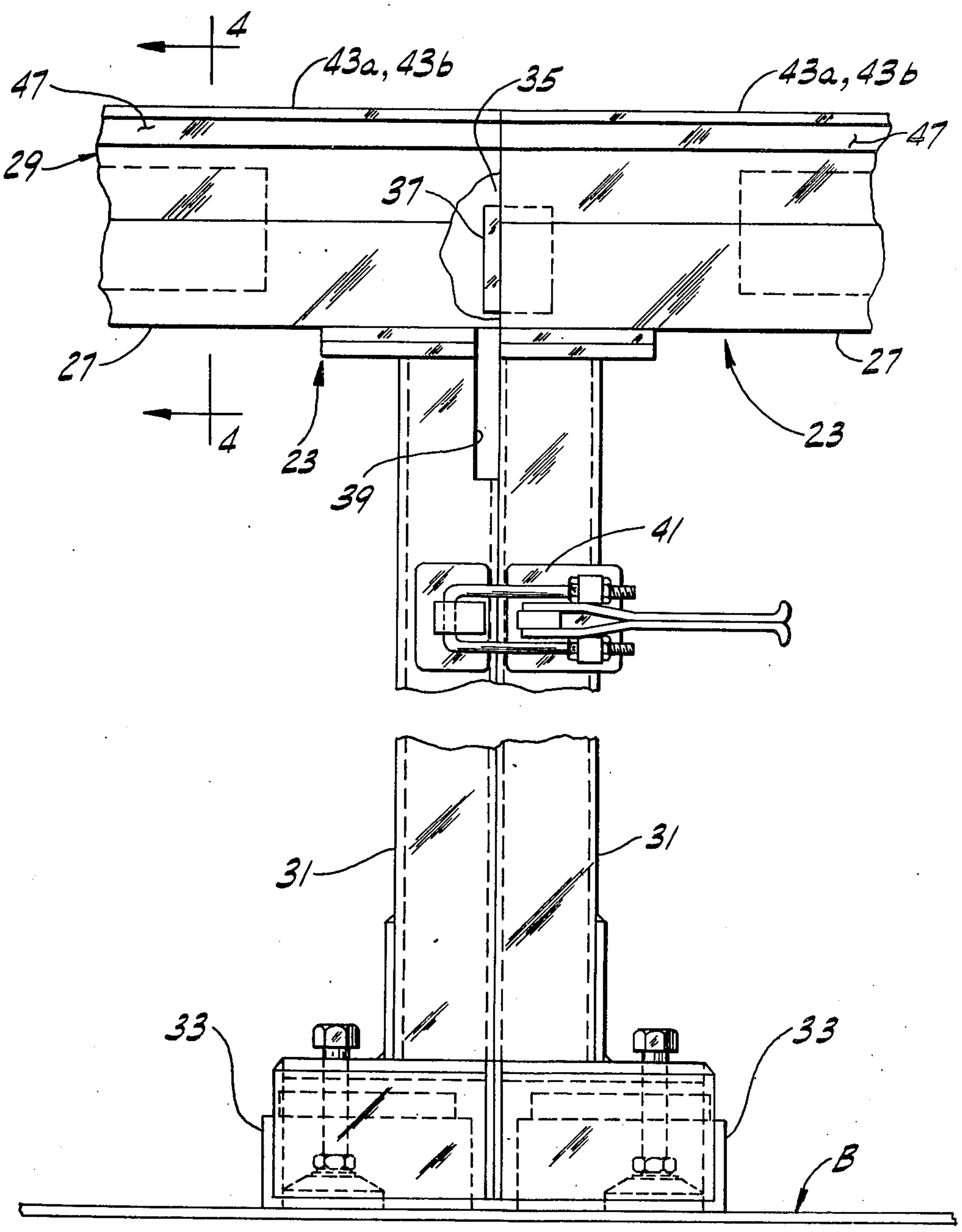
FIG. 3 is an enlarged scale side elevational view of two adjacent support frames secured together in end-to-end abutting relation.

In accordance with this invention, frames 23 are intended for rapid set up thereby to facilitate rapid changeover from apparatus for making roof trusses to apparatus for making flat floor trusses and to facilitate making floor trusses of various configurations, cambers, lengths, and depths. As shown in FIG. 3, legs 31 each have electromagnets 33 on their bottom ends which when energized adhere to magnetic base B to firmly hold the frames in position on the base. Electromagnets 33 are electrically connected to a power source and may be simultaneously energized and deenergized simply by throwing a common switch (not shown). By providing frames 23 with electromagnets 33, the frames may be readily positioned on the magnetizable base B and almost instantaneously secured in place at any desired location on the base. It will be understood, however, that means other than eletromagnets 33 may be provided for securing the frames in position on the base.

For example, the frames may be adapted to be secured to a floor mounted track system or may be permanently bolted to the floor if the quick change feature of the magnetic bases is not deemed important in a particular installation.

To further facilitate quick changeover of the apparatus of this invention and to insure proper alignment of tracks 29 of abutting frames 23, each frame has a groove 35 at one end thereof (see FIG. 4) and a tongue 37 at the other end thereof (see FIG. 3) with the groove of each frame being adapted to snugly receive the tongue of an adjacent frame thereby to insure proper alignment of the adjacent frames. The end of frame 23 having groove 35 therein (i.e., the right side of the frame is shown in FIG. 3) has a notch 39 formed therein below track 29 so that the frame may be lowered relative to the tongue of a previously positioned frame and so that the tongue may be placed beneath the groove whereby upon lowering the frame, the groove will readily receive the tongue. Alternatively, the tongue may be lowered into the groove from above or the two frames may be slid horizontally toward one another on base B so that the tongue enters the groove in endwise direction.

With frames 23 in end-to-end abutting relation, their adjacent legs 31 are in close side-by-side relation. These adjacent legs carry clamps 41 which when engaged pull legs 31 and the ends of beams 27 and tracks 29 into snug side-to-side and end-to-end abutting relation. Tracks 29 of adjacent frames 23 thus form a continuous center track.

Figure 4:
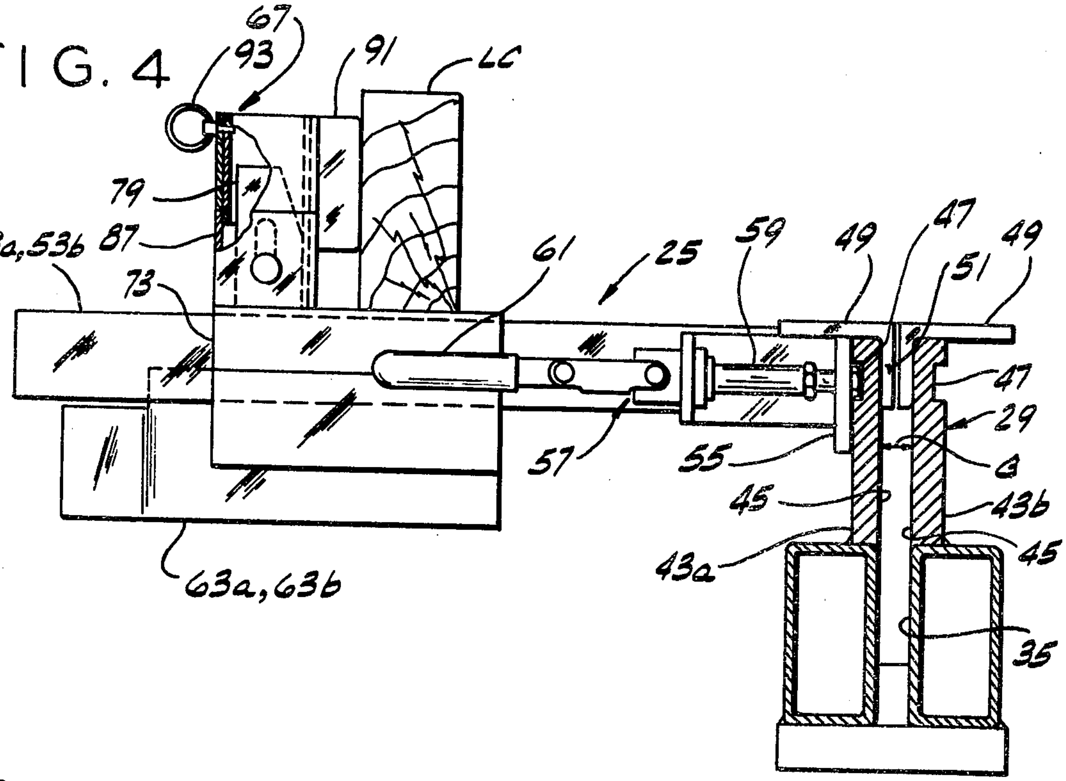
FIG. 4 is a vertical cross section taken along line 4—4 of FIG. 3 showing a wood member support platform.
Figure 5:
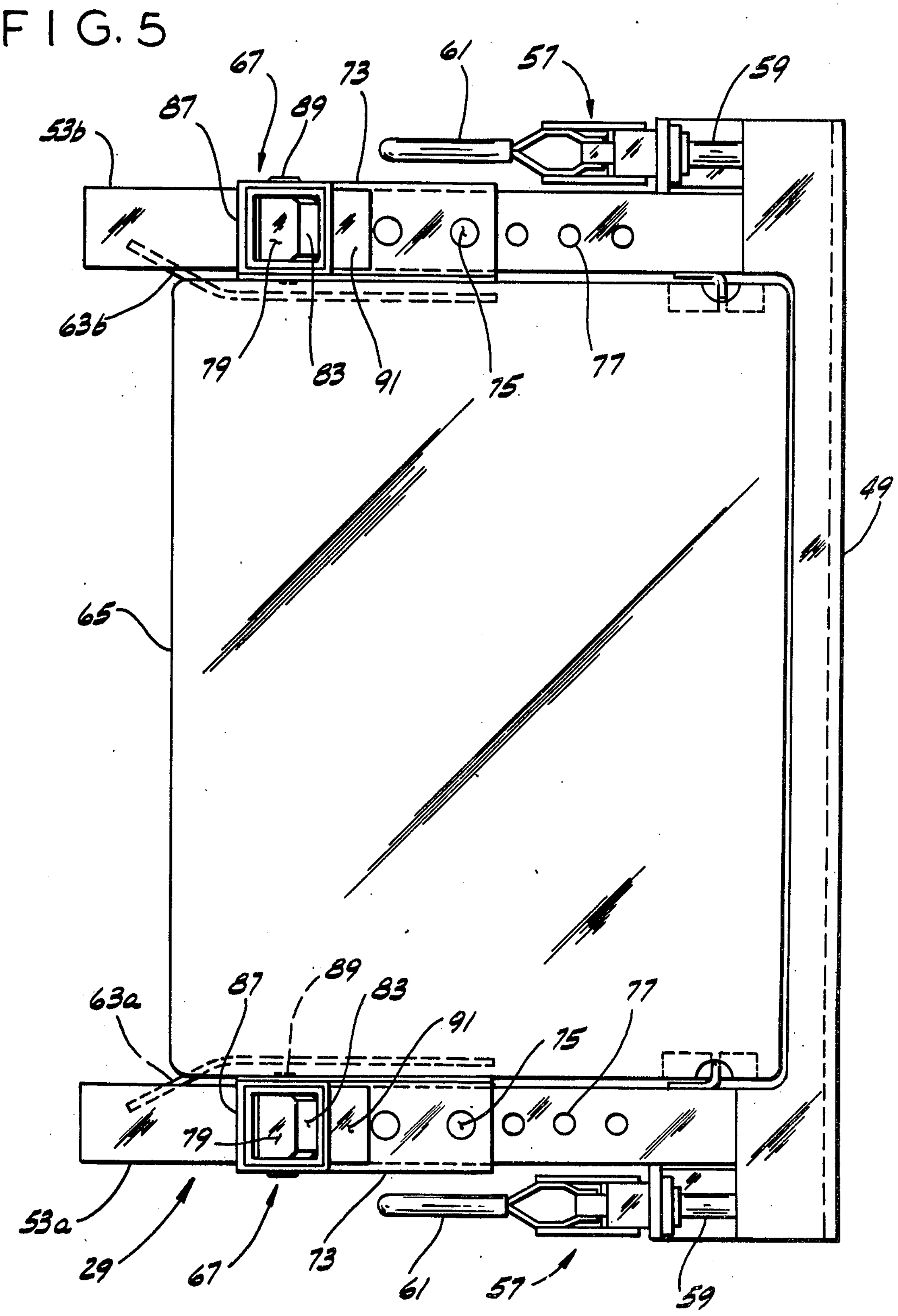
FIG. 5 is a plan view of the lumber support platform of FIG. 4.

Track 29 is shown (see FIG. 4) to comprise two elongate track members **43*a*, 43*b* arranged in back-to-back relation on opposite sides of the longitudinal center line of the frame 23 with a gap G therebetween. Each track member has a backface 45 and a groove 47 in its outer face. As best shown in FIGS. 4 and 5, each support platform 25 comprises an angle-shaped base member 49 extending widthwise of the platform at its inner end. Base member 49 has a vertical leg portion 51 adapted to be received in gap G and to bear against the backface of its respective track member 43*a*, 43*b*. A pair of lumber support arms 53*a*, 53*b* is rigidly secured (i.e., welded) to base member 49 and is cantilevered there from so that with the support platform installed on track 29**, the cantilever arms extend horizontally outwardly from the base member and are generally perpendicular thereto and to the track. The upper faces of the cantilever arms establish a generally horizontal plane on which the wood members are supported in position for being secured together.

An abutment plate 55 is secured (as by welding) to base member 49 at the inner ends of arms **53*a*, 53*b*, this plate being spaced from the outer or front face of its respective track member 43*a*, 43*b*** a distance somewhat greater than the thickness of the track member. This abutment plate thus holds the platform on the track with the cantilever arms generally horizontal but yet permits the platform to be freely slid along the track or to be manually lifted therefrom.

Platform 25 further comprises a clamp, as generally indicated at 57, at each side thereof for securely clamping the platform to track 29 at any desired location therealong and to readily release the platform from the track. Clamp 57 is shown to be a quick release clamp, such as a Model 604 toggle clamp commercially available from the De-STA Company, having a reciprocal plunger 59 movable in generally axial direction toward and away from their respective track members. More specifically, plunger 59 is axially movable between a clamping position in which the plunger fits into groove 47 and in which its track member **43*a*, 43*b* is securely clamped between the plunger and leg portion 51. The plunger is oppositely movable from its clamped position to a clear or retracted position in which the plunger is free of the track member and in which the platform may be freely moved along the track or lifted therefrom. Clamp 57 is shown to have a handle 61 interconnected to plunger 59** by an overcenter linkage arrangement for moving the plunger between its clamping and retracted positions and for locking the plunger in its clamping position.

Figure 6:
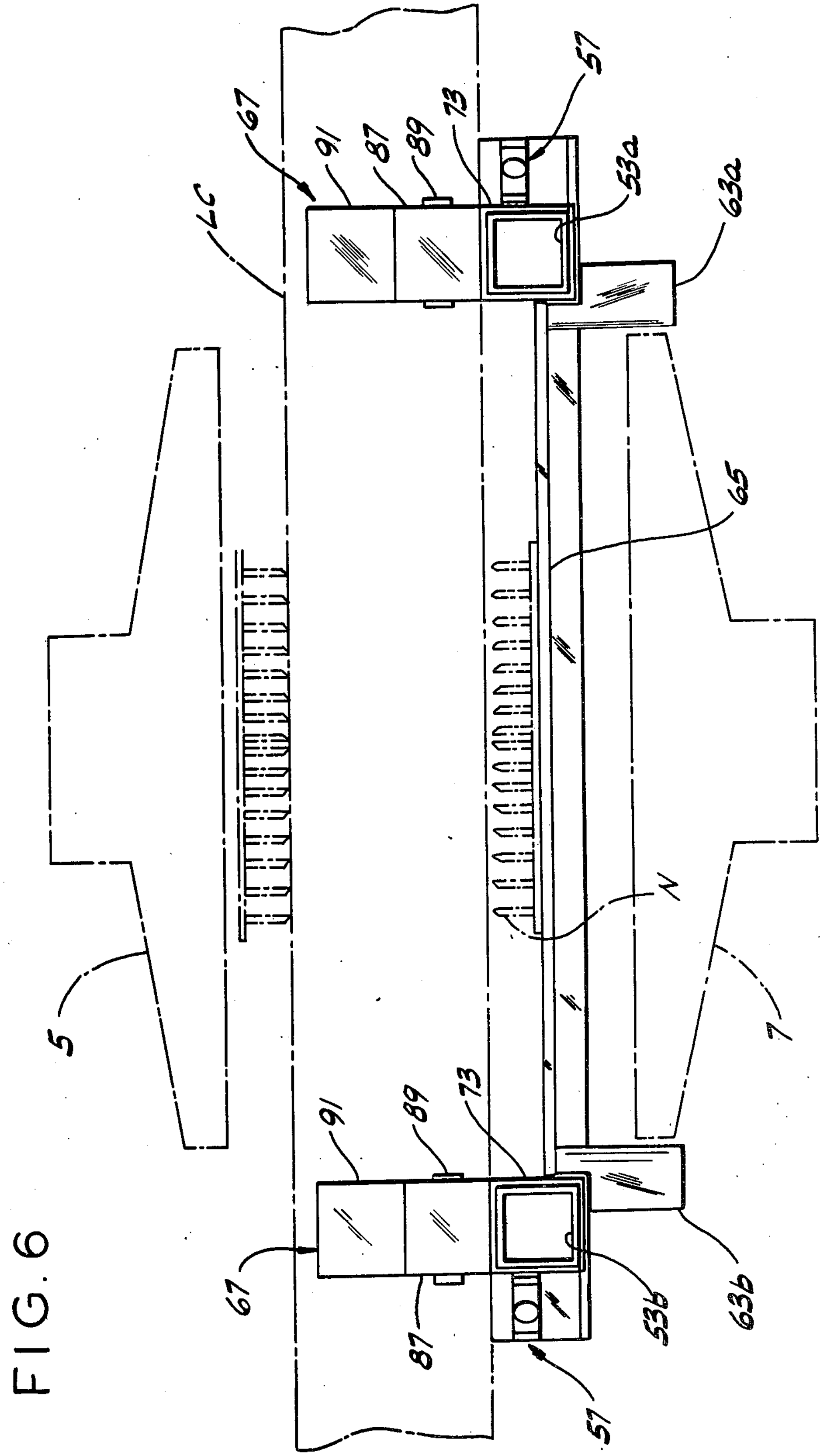
FIG. 6 is a front elevational view of the lumber support platform showing the position of the upper and lower platens of the hydraulic press (shown in phantom) relative to the wood members and the lumber support platforms when the press is in its operating position at a lumber support platform for pressing the nailing plates into the wood members from above and below.

As best shown in FIG. 6, arms **53*a*, 53*b* of each platform 25 are spaced from one another a distance somewhat greater than the width of lower platen 7 of press 3 whereby the press may be positioned in an operating position at each of the platforms with its lower platen generally centered between the arms below the wood members and with its upper platen 5 above the wood members for simultaneously driving or pressing nailing plates N into the wood members supported by the platform from above and below. Arms 53*a*, 53*b* each carry a respective guide 63*a*, 63*b* cooperable with a lower platen of the press for guiding the press as it is moved toward and away from the platform in a direction generally perpendicular to the chords of the truss (i.e., generally heighthwise of the truss) for movement into and out of its operating position at each of the platforms. Guides 63*a*, 63*b*** center the lower platen of the press between the cantilever arms and thus prevent damage to the platform upon closing of the press.

A locator plate 65 is loosely carried by each platform 25 for movement between a lowered position in which it is spaced below the level of the upper surfaces of arms **53*a*, 53*b* and the wood members supported thereon for holding a nailing plate with the teeth of the nailing plate pointing upwardly for being driven into the wood members from below and a raised position in which the top surface of the locator plate is generally coplanar or flush with the upper surfaces of the arms and in which the nailing plate supported thereby is fully driven or pressed into the wood members. Locator plate 65 is engaged by the lower platen of the press upon closing of the press and is moved upwardly from its lowered to its raised position by the lower platen of the press. Another nailing plate N is laid on top of the wood members (see FIG. 6) with its teeth pointing down. The upper platen of the press is spaced thereabove so that upon closing of the press when the press is in its operating position, both nailing plates are simultaneously driven into the wood members from above and below. It will be understood that with the press 3 suspended from counter-balanced boom 19 and with locator plate 65 being movable upwardly, substantially no force is transmitted from the press to the platform 25** upon pressing the nailing plates into the wood members. Thus, the platforms need not resist the extremely high forces required to press the nailing plates into the wood members.

Further in accordance with this invention, a stop, as is generally indicated at 67, is adjustably carried by each arm **53*a*, 53*b* of each platform 25 and is engageable with the outer vertical faces of the upper and lower chord members UC and LC to hold these chord members in a predetermined position relative to one another and to prevent outward movement of these chord members relative to track 29 beyond a desired position corresponding to the desired depth of the truss to be fabricated. The apparatus of this invention further comprises a plurality of air cylinder units, each of which is generally indicated at 69, positionable under the truss T being fabricated so as to engage the completed truss and to lift it vertically upwardly from the support platforms 25 for ejecting it from the apparatus clear of stops 67 so that it can be readily removed from the apparatus. Lift cylinder units 69 are shown to have a magnetic base 71 thereon so that the units may be selectively positioned at any desired location on base B under the truss being fabricated clear of the support platforms 25** for engagement with one or more wood members in the truss for lifting it upon actuation of the lift cylinder units.

Figure 7:
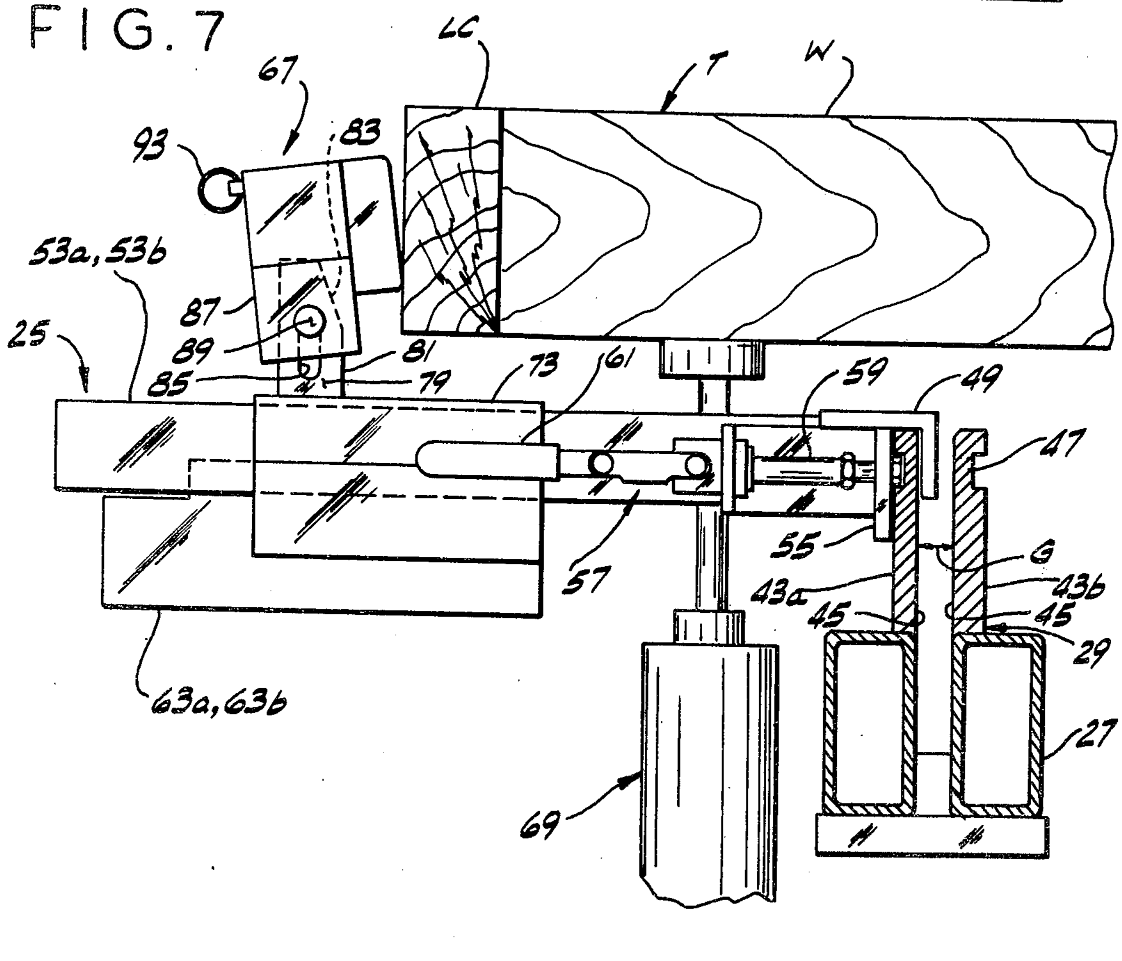
FIG. 7 (sheet 3) is a view similar to FIG. 4 illustrating an air cylinder unit for vertically ejecting a completed truss from the lumber support platforms and illustrating lumber stops in a released position thereby permitting the truss to be ejected without undue friction between the truss and the lumber stops.

Each stop 67 is shown to include a stop base 73 releasably securable to a respective cantilever arm 53*a*, 53*b* at any one of a number of preselected positions therealong by means of a pin 75 (see FIG. 6) inserted through a selected hole of a series of holes 77 spaced along a length of the cantilever arms, these holes corresponding to the predetermined depths of the truss to be fabricated. The stop base includes a stop block 79 secured to its upper face. As shown in FIG. 7, this stop block has a generally vertical face 18 facing toward the outer face of its respective truss chord member UC or LC and a second or inclined face 83 angling upwardly and outwardly away from the outer face of the truss chord member. An elongate vertical slot 85 extends through the stop block with the parallel sides of the slot being generally parallel to the outer face of the truss chord member adjacent thereto with the slot extending up above the level of the intersection between faces 81 and 83. An adapter or abutment member 87 is telescopically received on the stop block and is movably secured relative thereto by a pin 89 extending through slot 85. The abutment member has a body which telescopically fits on stop block 79 and which carries pin 89. Camber member or face 91 is releasably secured to the body of abutment 87 by a pin 93, the abutment and camber member constituting a lumber engaging member. The camber member or face is engageable with the outer surface of a respective truss chord member, as shown in FIG. 4. Both the body of abutment 87 and camber member 91 are movable relative to stop block 79 from a lowered stop position (as shown in FIG. 4) in which the inner surface of the abutment member body bears against the vertical surface 81 of the stop block and in which the camber member bears against its respective chord member thereby to positively prevent outward movement of its chord member relative to the stop and a release position (as shown in FIG. 7) in which the stop permits lifting units 69 to lift a completed truss T above the level of the stops without undue friction of the stops bearing against the outer surface of the truss chord as the truss is lifted. More particularly, as lift units 69 are actuated and truss T begins to move upwardly, friction between the outer surfaces of the truss chord members and the camber members or faces lifts the camber members and the abutment members along with pins 89 relative to stop bases 79. Upon pin 89 being lifted above a point approximately equal to the intersection of surfaces 81 and 83 of the stop block, the abutment and camber members are released from their upright stop position and are free to pivot about pin 89 outwardly away from the outer surface of the truss chord member upon further upward movement of the truss by the lift cylinder units. This, of course, releases the truss from the stop and allows it to be easily removed therefrom. Because the abutment members are free to move upwardly relative to their stop bases to an intermediate position (at which point pin 89 is approximately at the level of the intersection between faces 81 and 83) and because they swing outwardly away from the truss as it moves to its release position, the relative movement between the face 91 and the truss, during the vertical lifting of the completed truss to eject it, is minimized and the only sliding frictional force developed therebetween is that necessary to pivot the face 91 outwardly. Stops 67 thus positively hold the chord members in position and resist outward movement thereof and yet enable the truss to be readily ejected without the necessity of releasing the stops to permit ejection and resetting of the stops prior to fabricating the next truss. This, in turn, speeds up truss fabrication. As heretofore mentioned, camber members or faces 91 are releasably secured to the abutment body 87. By providing a series of various camber members having varying camber dimensions (i.e., having different dimensions from the lumber engaging face thereof to surface 81 of stop block 79) and by installing predetermined camber members on the stop bases along the length of the truss, trusses may be readily fabricated having predetermined amounts of camber or bow formed therein. The production of prebowed trusses is especially advantageous because they result in buildings having flatter floors as the camber tends to offset deflection of the truss.

Figure 9:
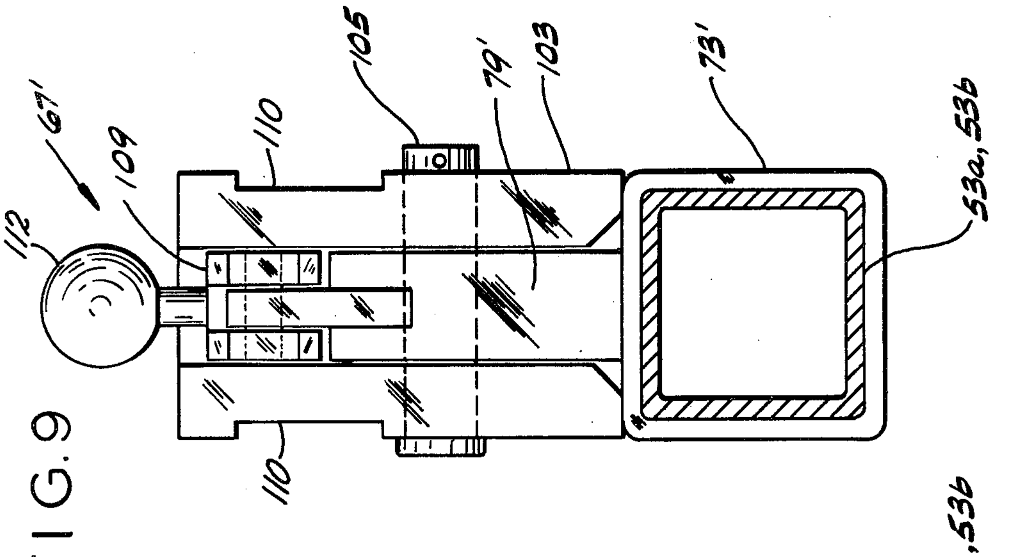
FIG. 9 is an end elevational view of FIG. 8.
Figure 8:
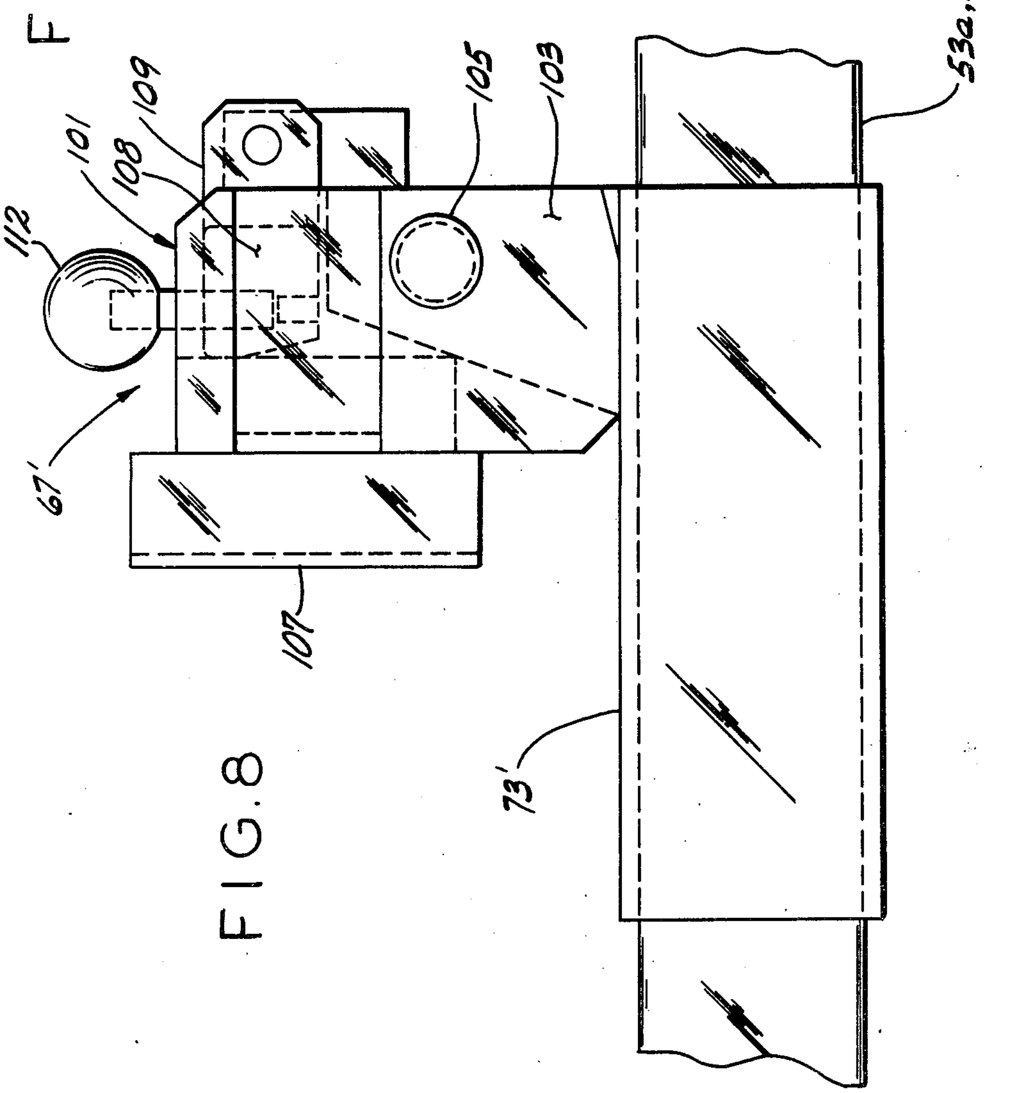
FIG. 8 is a side elevational view of another embodiment of the lumber stop shown in FIGS. 4 and 7.

As shown in FIGS. 8 and 9, a modification of stop 67 is shown, this modified stop being generally indicated at 67'. Stop 67' is shown to comprise a stop base 73' telescopically received on a cantilever arm 53*a*, 53*b* of platform 25. A stop block 79' is secured to the stop base and an abutment 101. The abutment member includes a pivot member 103, which is generally analogous to abutment member 87 of stop 67, the pivot member being pivotally secured to stop block 79' by a pin 105. A camber member or face 107 is releasably carried by the pivot member for engagement with the chord of the truss being fabricated. The camber member is shown to have a U-shaped bracket 108 which fits within complementary shaped recesses 110 in the sides of the pivot member (See FIG. 8 which shows the camber member 107 and FIG. 9 which does not). As heretofore explained in regard to stop 67, these camber members can readily be exchanged for camber members of other sizes whereby truss of a predetermined size can readily be fabricated. Stop 67' normally resists outward movement of the chord member in engagement therewith. Upon lifting of the completed truss, the abutment member is free to rotate about pin 105 (i.e., move upwardly and outwardly) from its lowered stop position to its release position in which it is clear of the chord member. As indicated at 109 a lock member with an attached knob 112 is provided which engages the abutment member and prevents the latter from pivotally moving from its lowered stop position to its retracted or release position. Lock member 109 is shown to be pivotally secured to stop block 79' and is readily manually moved from its locking position (as shown in FIG. 8) to a retracted position (not shown) in which the abutment member is free to pivot to its release position upon the lifting of the truss. Lifting of the truss is necessary in order to move the abutment member upwardly and outwardly even after the lock member 109 is moved, because the pin 105 is positioned above the bottom edge of the face 107. It will be noted that with stops 67', there is little or no relative sliding friction between parts of the stop upon lifting of the truss. Thus stops 67' may be preferred in certain instances where the completed truss is manually lifted from the apparatus.

Figure 2:
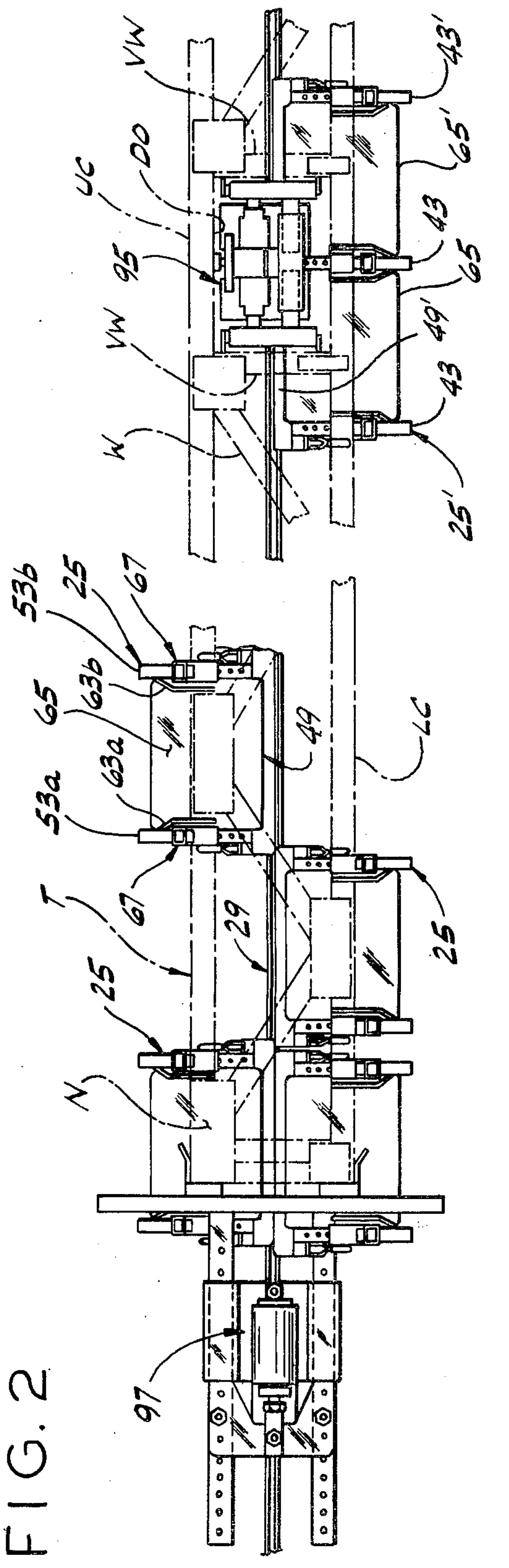
FIG. 2 is an enlarged partial plan view of a series of wood members held in position on the support frames for being secured together by nailing plates to form a flat floor truss.

Apparatus 1 further includes a center lumber clamp, as generally indicated at 95 in FIG. 2, engageable with the vertical inner web members VW to push these members outwardly toward the ends of the truss. As members VW engage the diagonal web members W, these diagonal web members are forced into snug engagement with the inner faces of the upper and lower chord members UC and LC and push the cord members outwardly into firm engagement with the camber members 93 of stops 67. End clamps, each of which is generally indicated at 97, are provided at each end of the truss to resist outward forces on the end web members. These center and end clamps are generally similar to the clamps disclosed in U.S. Pat. No. 3,866,350 which may be referred to for a more detailed description of these clamps.

It will be understood that special lumber platforms 25' (see FIG. 2), may be provided, as required, to accommodate various truss configurations in which two or more joints of the truss are so close together that two platforms 25 cannot be positioned sufficiently close together so as to support nailing plates N for these joints in their required positions, such as at the center of a truss having a duct opening DO therein. These modified lumber support platforms 25' have a common base member 49' three cantilever arms 43' extending therefrom and two locator plates 65'. Platform 25' carries the center lumber clamps 95, and other than as described above, is essentially of identical structure and function as platform 25.

In use, a conventional roof truss fabricating machine, such as the above-mentioned MONOPRESS roof truss fabricating machine, may be readily converted for production of flat floor trusses by removing the roof truss wood members supports from base B and by placing frames 23 of the present invention thereon in end-to-end abutting relation. This may be accomplished by positioning a first frame on the base and energizing its electromagnets 33 to secure it in position on the base, and by then moving another frame into endwise relation therewith so that tongue 37 of one of the frames is received in groove 35 of the other of the frames. This tongue and groove arrangement facilitates the alignment of the frames and their tracks 29 relative to one another. Clamp 41 is then operated to draw the legs 31, center beams 27 and tracks 29 of adjacent frames in desired end-to-end abutting relation. Other frames are likewise joined together in a similar manner until an elongate support is provided at least as long as the truss to be fabricated. Lumber support platforms 25 are moved along track 29 so that one lumber support platform is provided for each joint of the truss to be fabricated (as shown in FIG. 2), preferably with the arms of the lumber support platforms centered relative to the joints to be formed. Clamps 57 are then operated to rigidly secure the lumber support platforms at their desired position along track 29. If certain lumber support platforms are already on the track and these platforms are not required to fabricate a truss of a desired configuration, they may readily be lifted from the track merely by moving the clamps 57 to their unclamped positions and by manually lifting the platforms from the track. Likewise, if additional platforms are required, they may be readily inserted on the track at any position therealong and clamped in their desired position. Camber members 91 are installed on their adapter bases 87 so that the chords of the truss to be fabricated are supported in a predetermined camber or bowed position. The wood members for truss T are positioned on the upper faces of cantilever arms **53*a*, 53*b* of the platforms and center and end clamps 95 and 97, respectively, are actuated so as to firmly clamp the wood members in position and against stops 67. Nailing plates N are placed on locator plates 65 below the wood members to be secured together and placed on top of the wood members. Press 3 is then moved into its operating position at a first platform 25 and actuated thereby to simultaneously drive nailing plates N into the wood members supported by that platform from above and below. The press is then opened and moved to the next successive platform and again operated thereby to drive the nailing plates into the wood members. This process is repeated at each of the lumber support platforms until all of the nailing plates have been driven into the wood members and the fabrication of the truss is completed. Actuation of air lift cylinder units 67 is then effected to cause the completed truss to be ejected vertically from the apparatus. As the completed truss is lifted by air cylinder units 69 each abutment member 87 and camber member or face 91 moves vertically relative to its stop block 79 until its pin 89 moves above the level of the intersections of faces 81 and 83** of the stop member. The stop is then free to rock outwardly away from the outer face of its chord members thus releasing the pressure between the abutment member and the wood structure to facilitate ejecting the wood structure vertically substantially without friction between the stops and the wood structure. The completed truss is then lifted from the apparatus and the stops automatically return by gravity to their stop position and the apparatus of this invention is then ready to begin fabricating the next truss.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In apparatus for fabricating wood structures, such as wood trusses, wall panels or the like, from wood members secured together by nailing plates, said apparatus having means for supporting the wood members in position for being secured together by said nailing plates, wherein the improvement comprises; a plurality of stops for securely holding the wood members in position prior to and while being secured together by nailing plates driven thereinto, each of said stops comprising a stop base adapted for adjustment to different positions on the supporting means, an abutment member having a face engageable by a wood member, said abutment member being mounted on said stop base for movement of its said face upwardly from a lowered stop position in which said abutment member prevents horizontal outward movement of said wood member by engagement of said wood member with said face and for movement of its said face at least in part outwardly from said wood member to release the wood structure for removal thereof from said supporting means, said abutment member being movable upwardly and outwardly for the release of the wood structure by the engagement of said wood member with said face of the abutment member as the wood structure is lifted from said supporting means after the nailing plates are driven thereinto, said face moving outwardly away from said wood structure at least in part so as to release the pressure between the abutment member and said wood structure to facilitate lifting of the wood structure.

2. An apparatus as set forth in claim 1, said abutment member being slideable up and down on said stop base and having a lost motion pivot connection with said base, said abutment member being interengageable with the base when in said lowered stop position to lock the abutment member in position for preventing horizontal outward movement of said wood member and being freed for swinging outwardly for the release of the wood structure as it moves upwardly.

3. An apparatus as set forth in claim 1, means for releasably locking the abutment member in said lowered stop position.

4. In apparatus for fabricating wood structures, such as wood trusses, wall panels or the like, from wood members secured together by nailing plates, said apparatus having means for supporting the wood members in position for being secured together by said nailing plates, wherein the improvement comprises; a plurality of stops engageable by said wood members for securely holding the wood members in position prior to and while being secured together by nailing plates driven thereinto, each of said stops comprising a stop base securable to said supporting means and a lumber engaging member carried by said stop base and being movable relative thereto between a stop position in which said stop prevents horizontal outward movement of the wood members and a release position which permits removal of the wood structure from said support means without said lumber engaging members unduly resisting lifting of the wood structure, wherein said stop base includes a stop block rigidly secured thereto, and wherein said lumber engaging member is telescopically movable relative to said stop block, said lumber engaging member and said stop being connected together by a pin-and-slot arrangement permitting movement of said lumber engaging member from its stop position to an intermediate position and thence to its release position, wherein said stop block has a first or vertical surface generally parallel to the outer surface of its respective wood member, a second surface angling upwardly and away from said wood member, and a generally vertical slot extending above and below the intersection of said first and second surfaces, and wherein said lumber engaging member has an inner surface engageable with said first surface thereby to resist outward movement of said wood member and a pin extending through said slot to constitute said pin-and-slot arrangement, whereby upon said wood member being lifted vertically said pin is lifted in said slot above the level of the intersection between said first and second faces thereby to permit said lumber engaging member to rock away from said wood member to its release position.

5. In apparatus for fabricating wood structures, such as wood trusses, wall panels or the like, from wood members secured together by nailing plates, said apparatus having means for supporting the wood members in position for being secured together by said nailing plates, wherein the improvement comprises; a plurality of stops engageable by said wood members for securely holding the wood members in position prior to and while being secured together by nailing plates driven thereinto, each of said stops comprising a stop base securable to said supporting means and a lumber engaging member carried by said stop base and being movable relative thereto between a stop position in which said stop prevents horizontal outward movement of the wood members and a release position which permits removal of the wood structure from said supporting means without said lumber engaging members unduly resisting lifting of the wood structure, wherein each of said lumber engaging members is vertically movable relative to its said stop base from said stop position to an intermediate position and is movable away from said wood members upon movement of said lumber engaging member from its intermediate position to its release position, said lumber engaging member being movable from its stop position to its release position by said wood member engageable therewith upon lifting of the wood structure, wherein each of said stop bases is releasably securable to said supporting means to any of a plurality of predetermined positions, and wherein said lumber engaging member comprises an abutment member telescopically received on said stop block and connected thereto by a pin-and-slot arrangement and a camber member releasably secured to said adapter member, said camber member being engageable with said wood members to position the outer surface of said wood members in a desired location thereby to permit fabrication of a wood structure having a predetermined camber.

6. In apparatus as set forth in claim 5 wherein said wood structure is a truss having at least one chord, said stops engaging the outer face of said chord and determining the camber of said chord, said apparatus further comprising a plurality of camber members interchangeably securable to said adapter members so that upon selecting camber members of predetermined cambers, a truss may be fabricated having a predetermined camber.

* * * * *